United States Patent

[11] 3,537,491

[72] Inventor: Victor Anthony Kolesh
 Holden, Massachusetts
[21] Appl. No.: 759,385
[22] Filed: Sept. 12, 1968
[45] Patented: Nov. 3, 1970
[73] Assignee: Wallace-Murray Corporation
 Fitchburg, Massachusetts
 a corporation of Massachusetts

[54] CUTTING TOOLS
 18 Claims, 16 Drawing Figs.
[52] U.S. Cl. ..................................... 143/133,
 29/78, 29/95, 144/218
[51] Int. Cl. ..................................... B27b 33/12,
 B27g 13/08
[50] Field of Search ........................................... 143/133—
 145; 144/218, 219, 231, 241; 29/95, 78, 79

[56] References Cited
UNITED STATES PATENTS
2,708,376  5/1955  Booth.............................. 29/78
3,104,562  9/1963  Kolesh............................. 76/112
FOREIGN PATENTS
530,384  9/1956  Canada .................. 143/133(—2)UX
416,825  9/1934  Great Britain............. 143/133(—2)UX Primary Examiner—Donald R. Schran
Attorney—Rowland V. Patrick ABSTRACT: Cutting tools having a series of solid truncated spheres seated in spherically contoured cavities in the body of the tool and presenting convexly curved (preferably circular) cutting edges facing the direction of cutting movement of the tool. The inserts may be variously located on the tool body and protrude, for example, in the case of circular saws from the side surfaces or the edge surface or both.

Patented Nov. 3, 1970  3,537,491

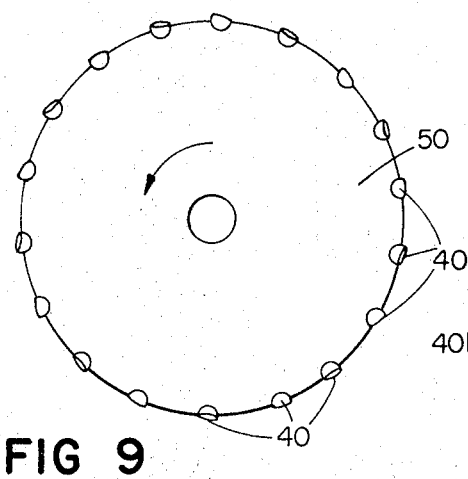
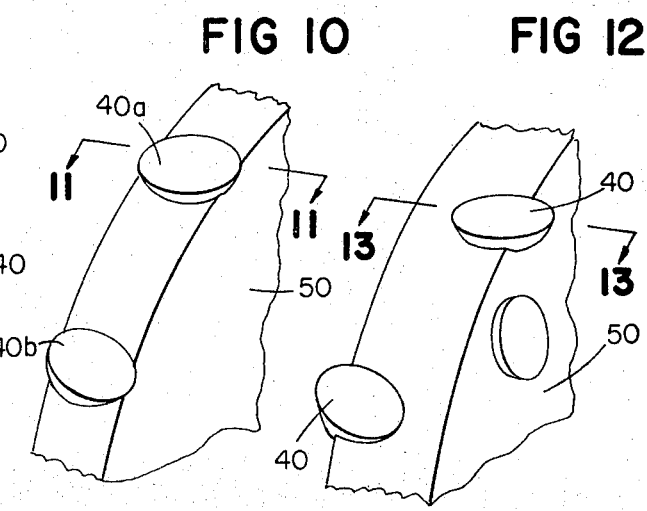
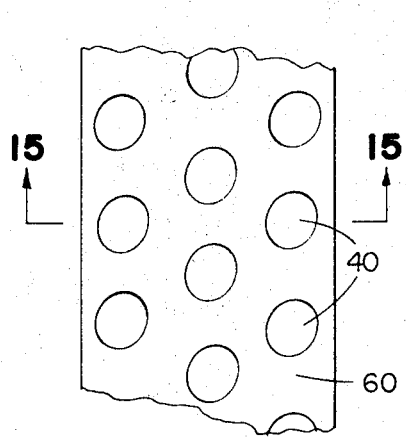
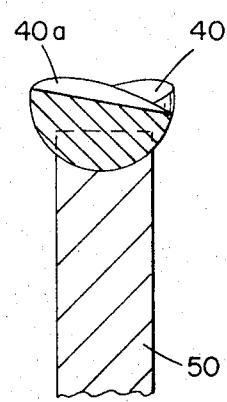
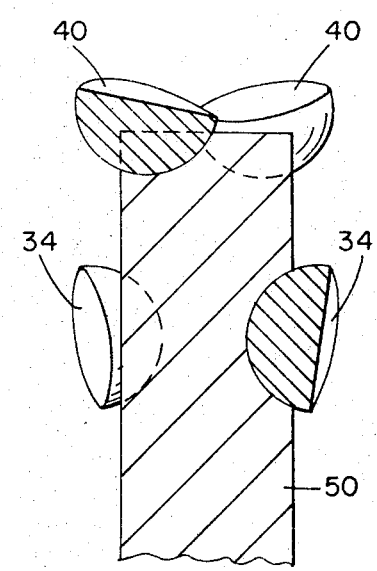
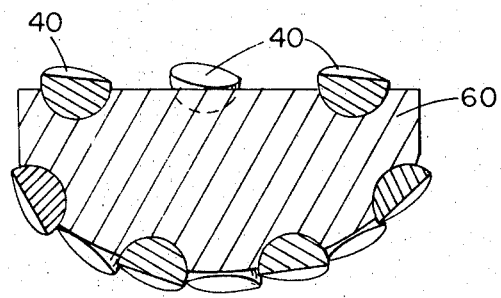
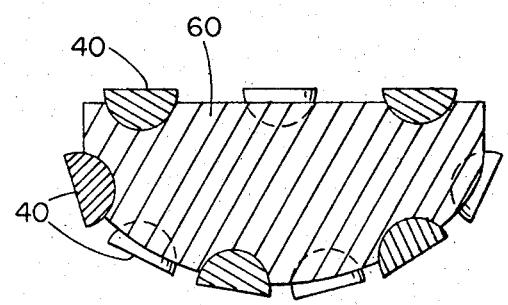

CUTTING TOOLS

This invention relates to cutting tools and more particularly to tools for cutting wood, plastic, rubber, micarta and similar, relatively soft materials including soft metals, though it may have other useful applications.

The invention is particularly concerned with a cutting tool which in saw form will make an exceptionally smooth cut in the above types of soft materials by providing a novel type of cutting action.

To this end, the tools have convexly arcuate and preferably circularly curved cutting edges crosswise of the cutting motion of the tool, each edge being formed by the truncation of a sphere inserted into a spherical receiving cavity formed in a surface of the cutting tool. In the case of saws, the truncated inserts may protrude from the side surfaces or the edge surface of the saw or both.

When seated in the edge surface, the inserts may extend beyond the side surfaces of the saw, and when seated in side surfaces, they provide side cutters which may or may not extend outwardly beyond the edge surface of the saw. In the latter case, the saw may have normal peripheral teeth and gullets with the side cutters inserted on the side surfaces of the teeth between adjacent gullets.

Such side cutters may be either spaced beneath the transverse cutting edges of the teeth or may form the outer portions of the teeth tips.

Where edge surface inserts are of less width than the saw body, they may be in laterally staggered relation either on successive teeth or along a straight or curved body edge.

Similarly, the side cutters may be staggered, with alternate inserts on one side and intervening inserts on the other side of a tool body.

The cutters on the edge of a saw blade may have their flat truncated surfaces normal to the plane of the blade or tilted with respect to the direction of cutting motion, either sideways or raked backwardly to provide relief, or both.

Similarly, cutters on each side surface of the blade may have their truncating surfaces all lying in the same plane or they may lie in different planes all parallel to the median plane of the blade throughout a series of teeth and then repeat or they may be tilted backwardly or inwardly or both.

Typical embodiments of the invention are shown in the accompanying drawings wherein:

FIG. 9 is a side elevational view of a circular saw body having inserts protruding only from its peripheral edge and being shown as having a counterclockwise rotation in contrast to the clockwise rotation of the saw of FIG. 1, for the purposes of clarity;

FIG. 10 is a detailed perspective view of the saw of FIG. 9;

FIG. 11 is a cross-sectional view taken along the line 11—11 of FIG. 10;

FIG. 12 is a detailed perspective view of a modified form of saw;

FIG. 13 is a cross-sectional view taken along the line 13—13 of FIG. 12;

FIG. 14 is a plan view of a section of a different form of cutting tool;

FIG. 15 is a cross-sectional view taken along the line 15—15 of FIG. 14; and

FIG. 16 is a cross-sectional view of a modification of the tool shown in FIG. 15.

Figure 1:
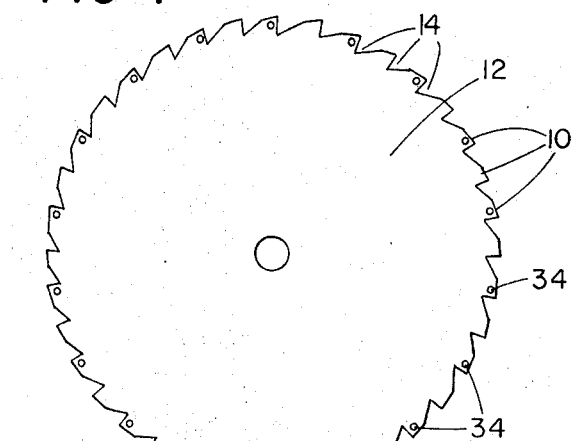
FIG. 1 is a side elevational view of a circular saw blade, having conventional set teeth and intervening gullets, provided with inserted truncated spheres on the side faces of the teeth.
Figure 3:
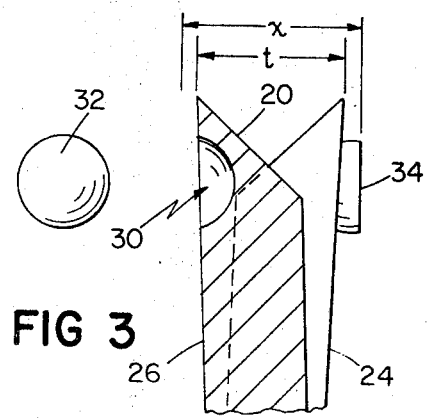
FIG. 3 is a cross-sectional view taken along the line 3—3 of FIG. 2, before the insertion of one sphere.
Figure 2:
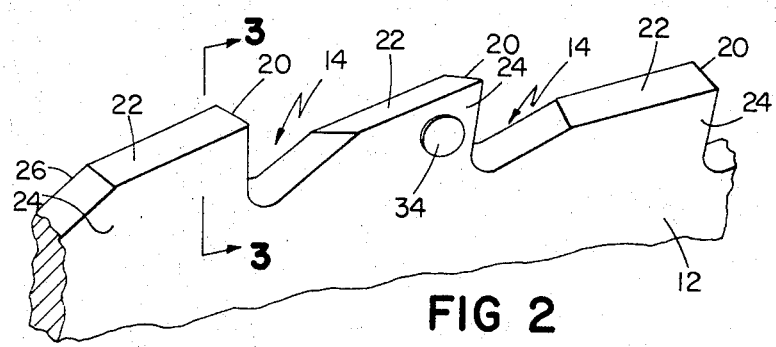
FIG. 2 is an enlarged detail of the saw shown in FIG. 1.

In FIGS. 1 and 2 of the drawings, there is shown a conventional circular saw having conventional set teeth 10 on the peripheral edge of body portion 12 separated by intervening gullets 14. Each tooth has a transverse leading, cutting edge 20, a trailing outer face 22, and side faces 24 and 26. A spherically contoured cavity indicated at 30 in FIG. 3 is ground into or otherwise formed in a side surface of each tooth below the tooth tip but above the bottom of the gullet, and a sphere, for example, a solid carbide or ceramic ball 32 of, for example, one-sixteenth inch diameter is inserted into each cavity and secured therein as by welding. Each ball is then ground off as indicated at the right in FIG. 3 to truncate the ball along a plane parallel to the median plane of the blade forming a flat, circular surface 34. The distance $t$ (FIG. 3) between these planes is thus greater than the kerf $x$ of the saw. For example, the dimension $t$ may be of the order of 0.079 inches and $x$ may be zero to 0.036 inches greater with balls of one-sixteenth inches original diameter.

As indicated in the drawings, preferably the truncated balls appear alternately on each side of the blade in the series of peripheral teeth.

Figure 4:
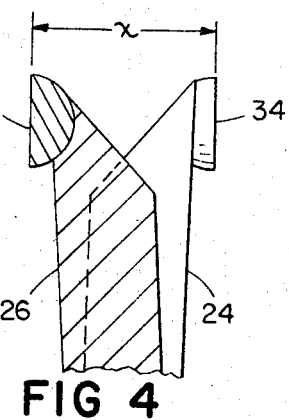
FIG. 4 is a cross-sectional view, like that shown in FIG. 3, illustrating a modified form of the invention.

In FIG. 4 there is shown a modification wherein the cavities instead of being placed well below the set tooth tips are nearer the tips so that when the balls are inserted and truncated, they will provide hard tips on every other tooth with the truncating surfaces being parallel to each other and to the median plane of the blade.

Figure 5:
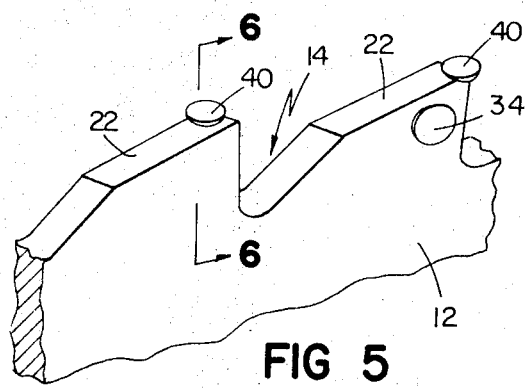
FIG. 5 is a view similar to FIG. 2 of a saw which has additional truncated spheres projecting from the trailing blade edges.
Figures 6, 7:
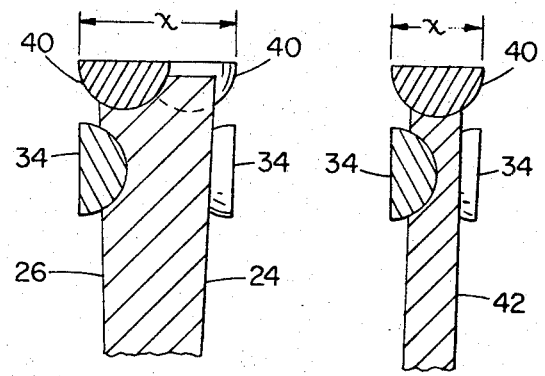
FIG. 6 is a cross-sectional view taken along the line 6—6 of FIG. 5.
FIG. 7 is a cross-sectional view similar to that shown in FIG. 6 illustrating a modified construction.

FIG. 5 illustrates a saw which includes in addition truncated hard spheres 40 which have been fastened into spherically contoured cavities in the trailing outer surfaces 22 of the teeth. Since the truncating surfaces 40 are of less width than the combined width of the set teeth, they are offset laterally on each successive tooth so that the truncated spheres of alternate teeth project outwardly beyond one side surface and the truncated spheres on intervening teeth project beyond the other side surface. Preferably as shown in FIG. 6 they extend outwardly so that their outer edges are tangent to the planes of the truncating surfaces on the side faces of the teeth and extend compositely over the total kerf distance $x$ of the saw. In this form the teeth need not but can be set. The blade may be relieved inwardly as shown in FIG. 6 or may be of uniform thickness as shown at 42 in FIG. 7. In FIG. 7, the truncated balls 40 are, as shown, wider than blade 42 and the truncating surfaces of balls 40 are of a width equal to the distance between the planes of opposite truncating side surfaces 34, 34.

Figure 8:
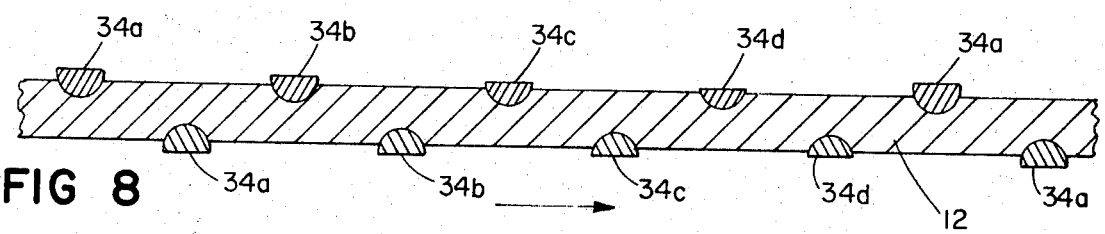
FIG. 8 is a cross-sectional, developed view illustrating a circular saw (omitting any showing of set peripheral teeth) which has modified settings of the inserts.

FIG. 8 illustrates a modification of the FIG. 1 structure wherein all the truncated surfaces do not lie in two planes, but rather they lie in different planes spaced at successively diminishing distances from the median plane of the saw throughout a series of teeth, four in number as shown in FIG. 8, 34a, 34b, 34c, 34d, and then repeat. This may be accomplished by changing the depth of the truncating cut without changing the depth of the cavities in which the inserts are placed.

FIGS. 9 and 10 illustrate a circular saw body 50 that has no teeth or gullets except those provided by truncated spheres 40 inserted along the peripheral edge of the saw.

In FIG. 10 the truncated spheres 40a and 40b are wider than the thickness of the saw body and alternating spheres 40a have their flat surfaces inclined in one direction towards the median plane of the saw body and intervening inserts 40b have their flat surfaces inclined in the other direction. In addition, the flat surfaces of all the inserts are inclined backwardly to provide relief and clearance behind the forward cutting edge. Such inclinations may also be provided in the FIG. 1—7 embodiments.

In FIG. 12, the truncated spheres are each of less width than the thickness of the saw body and are offset in staggered relation so that one truncated sphere extends beyond one side surface of the saw body and the next extends beyond the other side surface of the body. In FIG. 12 all the truncating surfaces in addition to being inclined inwardly are also inclined backwardly with respect to the direction of cutting motion of the saw as illustrated in FIG. 13.

FIG. 12 also shows side inserts whose truncating surfaces 34 are also inclined inwardly radially of the circular saw and backwardly of the direction of the cutting motion. Such inclinations of the side inserts 34 may be included in the embodiments of FIGS. 1—7 if desired.

FIGS. 14, 15, and 16 illustrate truncated spheres inserted on a flat surface of a body 60 presenting, in FIG. 16, truncating surfaces in the same plane and presenting, in FIGS. 14 and 15, inclined truncating surfaces to give cross-tilt. As indicated in FIGS. 15 and 16 the spherical cavities for accommodation of the truncated spheres 40 may also be on curved surfaces of the same bodies, for use as files or rasps. The pattern of the inserts on flat surfaces having inclined truncating surfaces may be such as to provide clearance to grind off a row of inserted spheres in a single pass, for example, the diamond pattern shown in FIG. 14.

The circular cutting edges become sharper after the balls are ground down beyond their centers; but they perform some cutting action even when ground off short of the ball centers. Because the truncating surfaces are circular, they cut in any direction, making a cutting tool in the embodiments of FIGS. 1—7 reversible so far as its cutting action is concerned, since in these embodiments, the truncating surfaces are not inclined to give clearance.

The side cutter surfaces 34 in a saw are found to perform a burnishing action which helps to smooth the sides of the cut, and, when cutting nonrigid materials such as rubber, they help to prevent gouging or collapsing of the material around conventional teeth cutting edges 20.

Obviously, the structures of FIGS. 5, 6, and 7 can omit the truncated ball surfaces 34 entirely if desired.

The structure of the invention may be incorporated into other tools such as straight saws, endless band saws, files, all forms of rasps, planar drums or shaped sections.

I claim:

1. A cutting tool comprising a body having a series of inserts projecting from at least one surface of said body, said inserts comprising solid, truncated spheres seated in spherically contoured cavities in said body and presenting convexly curved cutting edges facing the direction of cutting movement of the tool.

2. A cutting tool as claimed in claim 1 wherein said cutting edges are the circular edges of flat truncating surfaces of said truncated spheres.

3. A cutting tool as claimed in claim 2 wherein said body is a planar body having an edge surface and a series of said inserts are seated in spaced relation along said edge surface.

4. A cutting tool as claimed in claim 3 wherein each insert is wider than the thickness of the planar body and extends beyond both side surfaces of said planar body.

5. A cutting tool as claimed in claim 3 wherein said inserts are of less width than the thickness of the planar body and alternating inserts in said series extend beyond one of the side surfaces of the planar body and intervening inserts in said series extend beyond the other side surface of the planar body.

6. A cutting tool as claimed in claim 3 wherein alternating inserts in said series have their flat surfaces inclined inwardly in one direction and intervening inserts in said series have their flat surfaces inclined inwardly in the opposite direction.

7. A cutting tool as claimed in claim 6 wherein the flat truncating surfaces of said alternating and intervening inserts are, in addition, inclined backwardly away from the direction of cutting motion of said body.

8. A cutting tool as claimed in claim 1 wherein said body is a planar body having opposite sides surfaces and an edge surface, said tool having cutting edges on said edge surface and said inserts are seated in said side surfaces.

9. A cutting tool as claimed in claim 8, wherein the edge surface cutting edges are formed on teeth spaced along said edge surface and separated by intervening gullets, and the cutting edges presented by said inserts are above the bottoms of the gullets.

10. A cutting tool as claimed in claim 9 wherein the cutting edges presented by the inserts are the circular edges of flat truncating surfaces of said truncated spheres and the flat truncating surfaces of said spheres lie in planes parallel to the median plane of said planar body.

11. A cutting tool as claimed in claim 10 wherein the flat truncating surfaces on both sides of the cutting tool lie in a plurality of planes parallel to the median plane of said planar body.

12. A cutting tool as claimed in claim 8 wherein alternating inserts are on one side surface of said body and intervening inserts are on the opposite side surface of said body.

13. A cutting tool as claimed in claim 8 wherein said cutting edges presented by the inserts are the circular edges of flat truncating surfaces of said truncated spheres and the truncated surfaces of said spheres are inclined backwardly away from the direction of cutting motion of said tool.

14. A cutting tool as claimed in claim 13 wherein said flat surfaces are, in addition, inclined inwardly away from the edge of the tool.

15. A cutting tool as claimed in claim 3 having, in addition, a series of said inserts seated in side surfaces of said planar body.

16. A cutting tool as claimed in claim 15 wherein said edge surface inserts extend beyond both side surfaces of said planar body and said side inserts have their truncating surfaces lying in parallel planes intersecting the side edges of said edge surface inserts.

17. A cutting tool as claimed in claim 1 wherein said body has a flat surface and said inserts are seated in cavities in said flat surface with their convexly curved cutting edges lying in planes inclined to the plane of said flat surface.

18. A cutting tool as claimed in claim 1 wherein said body has a curved surface and said inserts are seated in cavities in said curved surface with each of their cutting edges lying in a plane.

UNITED STATES PATENT OFFICE
CERTIFICATE OF CORRECTION

Patent No. 3,537,491     Dated November 3, 1970

Inventor(s) Victor Anthony Kolesh

It is certified that error appears in the above-identified patent and that said Letters Patent are hereby corrected as shown below:

In the caption read "a corporation of Delaware" for "a corporation of Massachusetts".

SIGNED AND
SEALED
MAR 9 1971

(SEAL)
Attest:

Edward M. Fletcher, Jr.
Attesting Officer

WILLIAM E. SCHUYLER, JR
Commissioner of Patents